United States Patent [19]

Wilhelmy

[11] 3,815,452

[45] June 11, 1974

[54] MACHINE TOOLS

[75] Inventor: Herbert Wilhelmy, Northumberland, England

[73] Assignee: Machine Tool Divisional Services Limited, Coventry, Warwickshire, England

[22] Filed: Apr. 18, 1972

[21] Appl. No.: 245,094

[52] U.S. Cl. .................. 82/2 R, 82/21 R, 82/24 R
[51] Int. Cl. ............................................. B23b 9/00
[58] Field of Search ............ 82/2, 36 R, 28, 24, 36, 82/2 C; 29/39

[56] References Cited
UNITED STATES PATENTS

| 3,301,106 | 1/1967 | Le Brusque | 82/21 |
| 3,385,143 | 5/1968 | Walk | 82/28 |

Primary Examiner—Andrew R. Juhasz
Assistant Examiner—W. R. Briggs
Attorney, Agent, or Firm—Watson, Cole, Grindle & Watson

[57] ABSTRACT

An automatic lathe comprising a rotatable chuck to carry workpieces to be machined, a multi-armed tool-carrying turret adapted to be indexed about an axis parallel to that of the chuck to bring the tools successively into working position and to perform feed and return strokes in a direction parallel to the axis of the chuck, a locating guide for engaging in succession tenons on the turret arms during the feed and return strokes of the turret, and adjusting means for moving the locating guide through a predetermined distance when the tenon on the selected arm is engaged in it to rotate the turret about its axis and thereby to vary the radial distance from the axis of the chuck of the tool which is in working position to the extent necessary to compensate for tool wear.

9 Claims, 10 Drawing Figures

MACHINE TOOLS

This invention relates to automatic lathes of the type comprising a rotatable chuck to carry workpieces to be machined, a multi-armed tool-carrying turret, means for indexing the turret about an axis parallel to that of the chuck to bring the tools successively into working position, means for imparting feed and return strokes to the turret in a direction parallel to the axis of the chuck and a locating guide for engaging in succession tenons on the turret arms during the feed and return strokes of the turret.

In operation of such a lathe, the turret first of all indexes to bring a tool or tools associated with its first arm into operative position, it then performs a feed stroke to cause this set of tools to machine the workpiece carried by the chuck and then a return stroke, the turret then indexes again to bring a second tool or tools into operative position and feeds in again to machine the workpiece with the second set of tools. This cycle of operations is completed until the turret has made one complete revolution and has regained its starting position. The finished workpiece is then replaced by a new one. During machining the tenons on the arms of the turret cooperate in succession with the guide to prevent the turret from rotating.

Such a lathe is often required to machine large batches of identical workpieces and after a time tool wear will lead to the production of workpieces of incorrect dimensions.

The invention provides an automatic lathe of the above type which includes adjusting means for moving the locating guide through a predetermined distance when the tenon on a selected arm is engaged in it to rotate the turret about its axis and thereby to vary the radial distance from the axis of the chuck of the tool which is in working position to the extent necessary to compensate for tool wear.

One embodiment of automatic lathe in accordance with the invention will now be described in detail by way of example, with reference to the accompanying drawings, in which.

Figure 2:
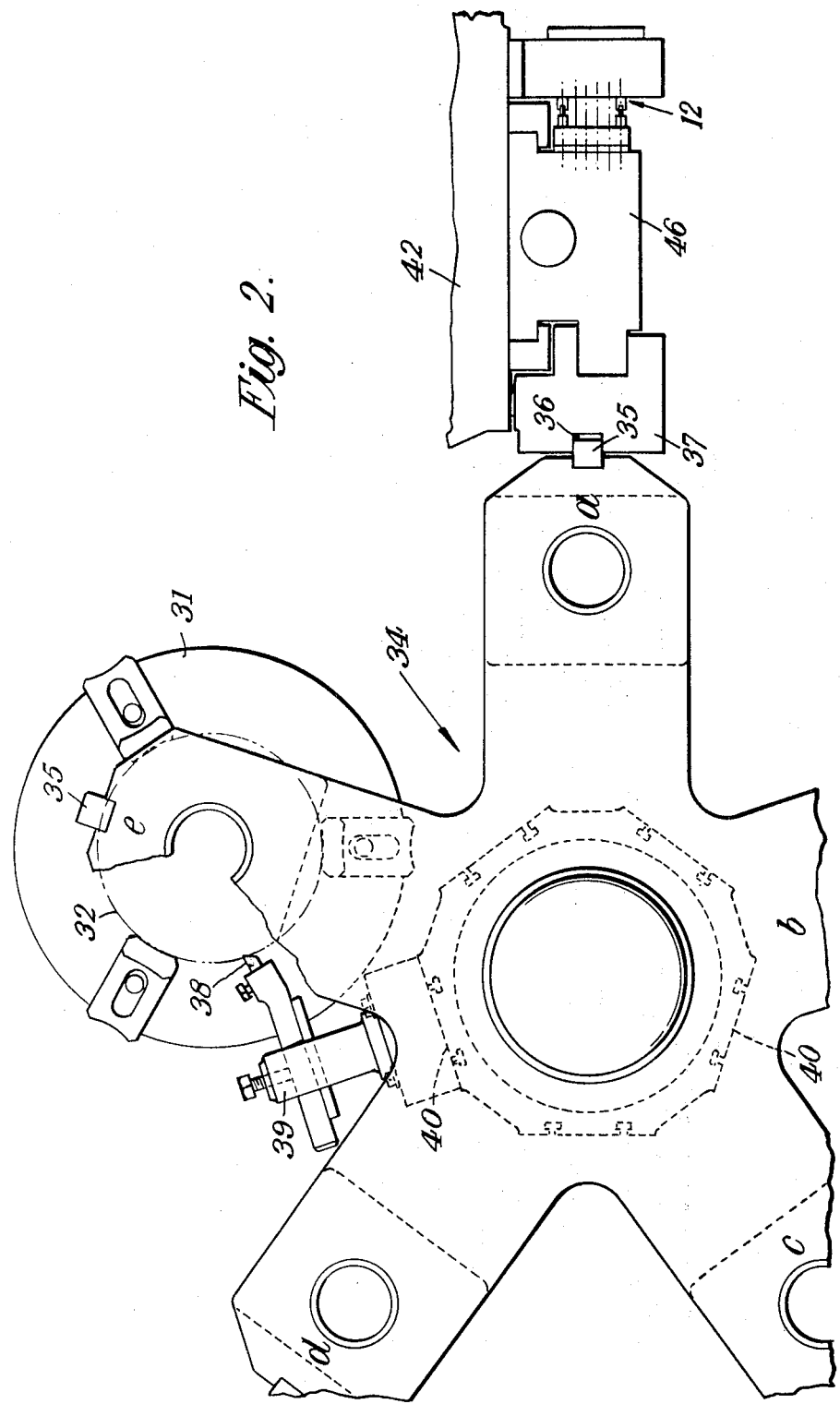
FIG. 2 is an end elevation of part of the turret of the lathe.
Figure 3:
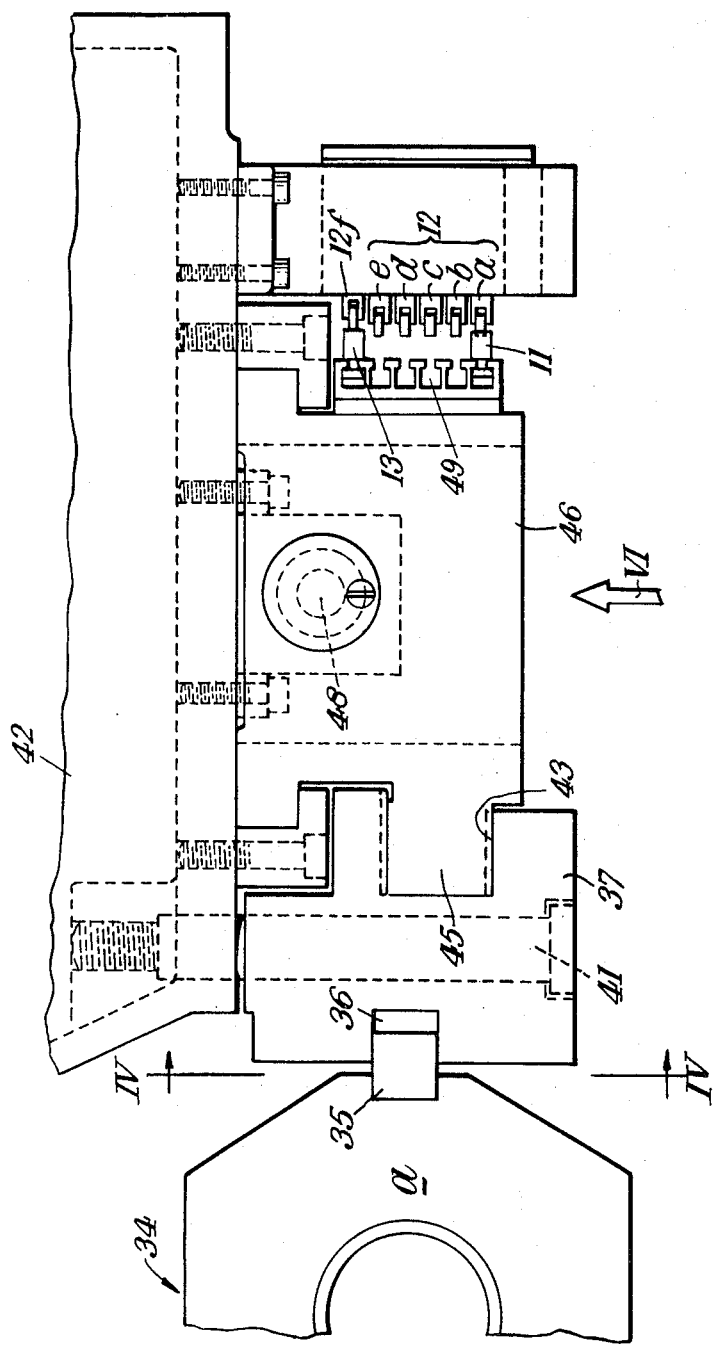
Figure 4:
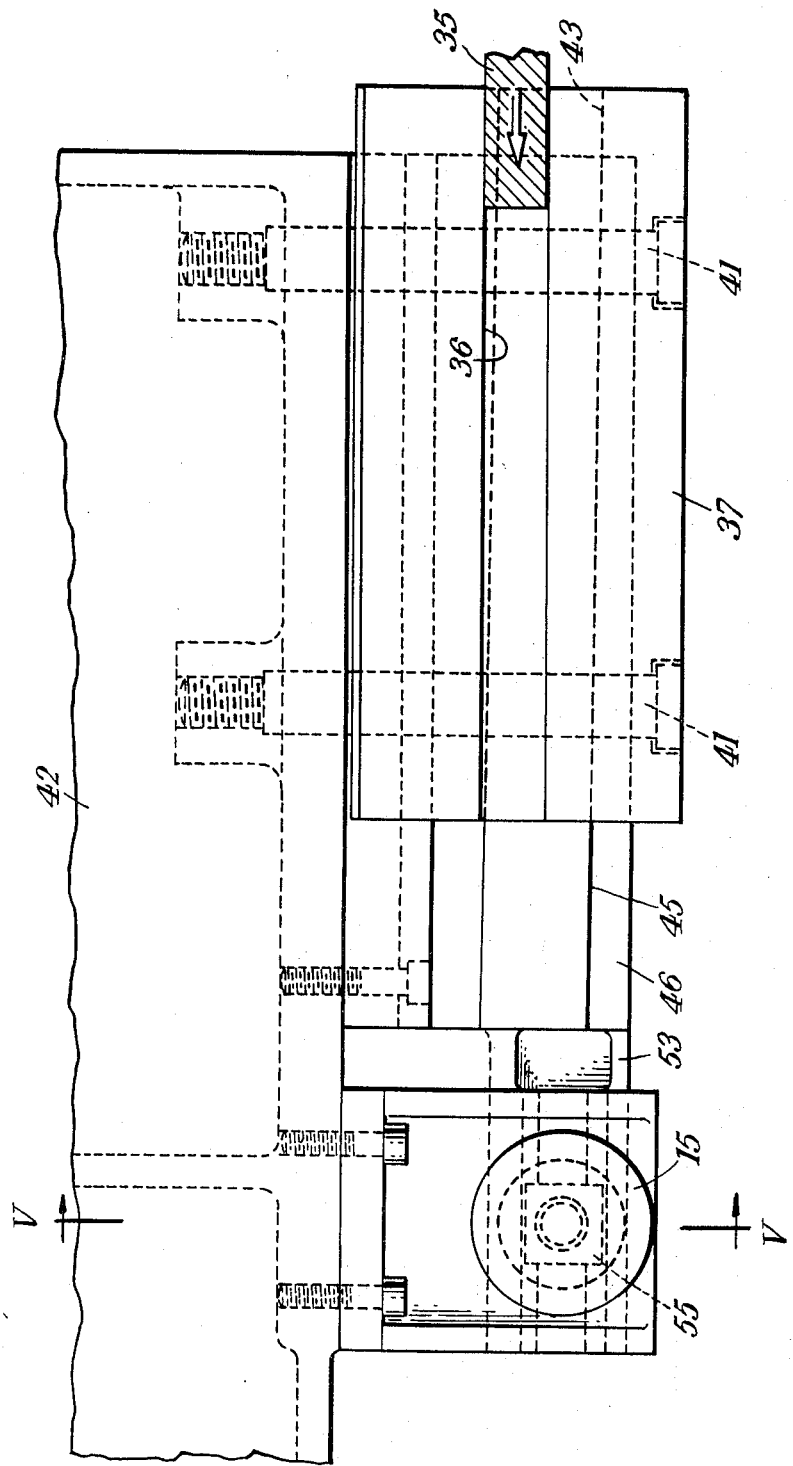
Figure 5:
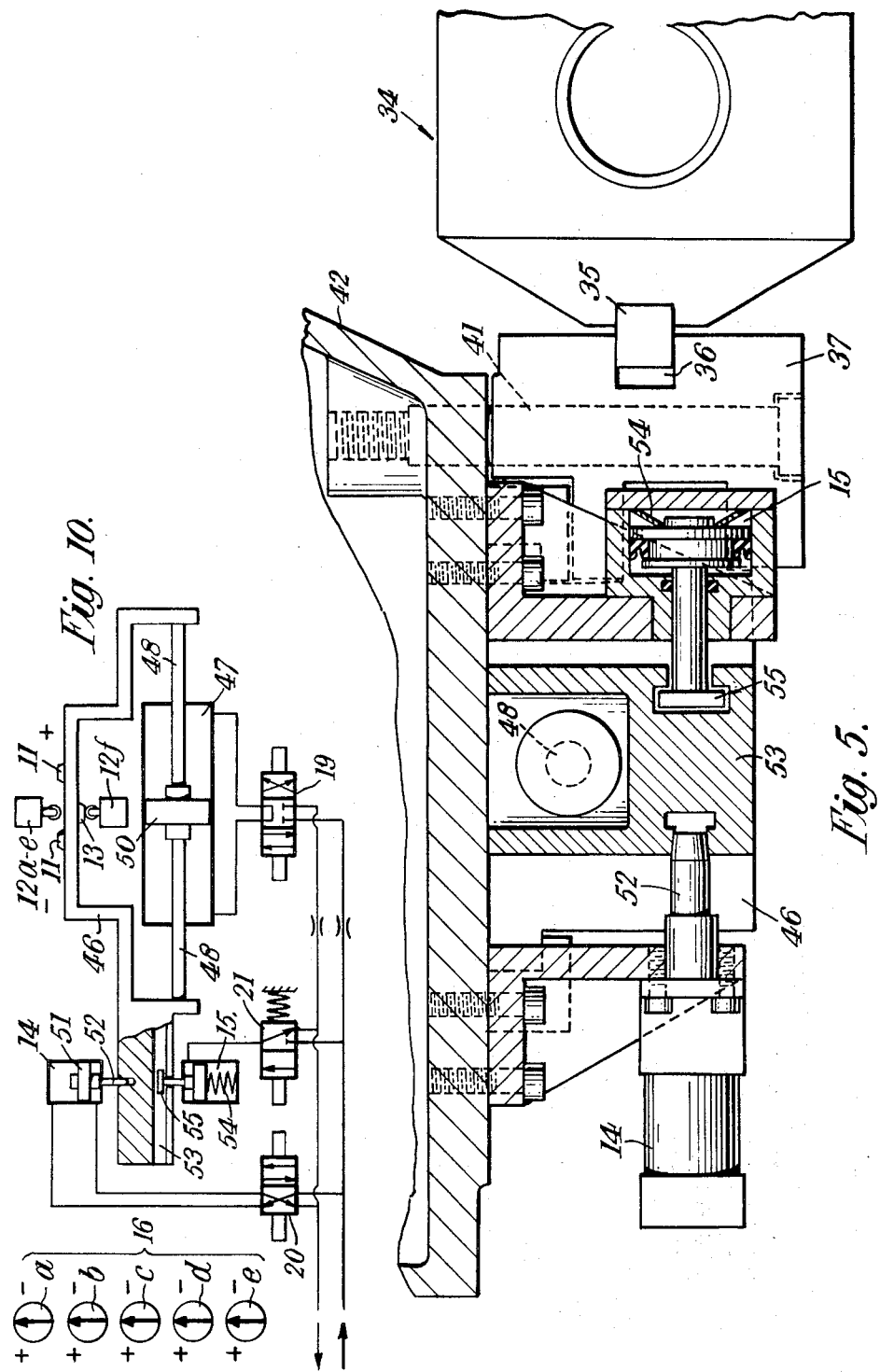
Figure 6:
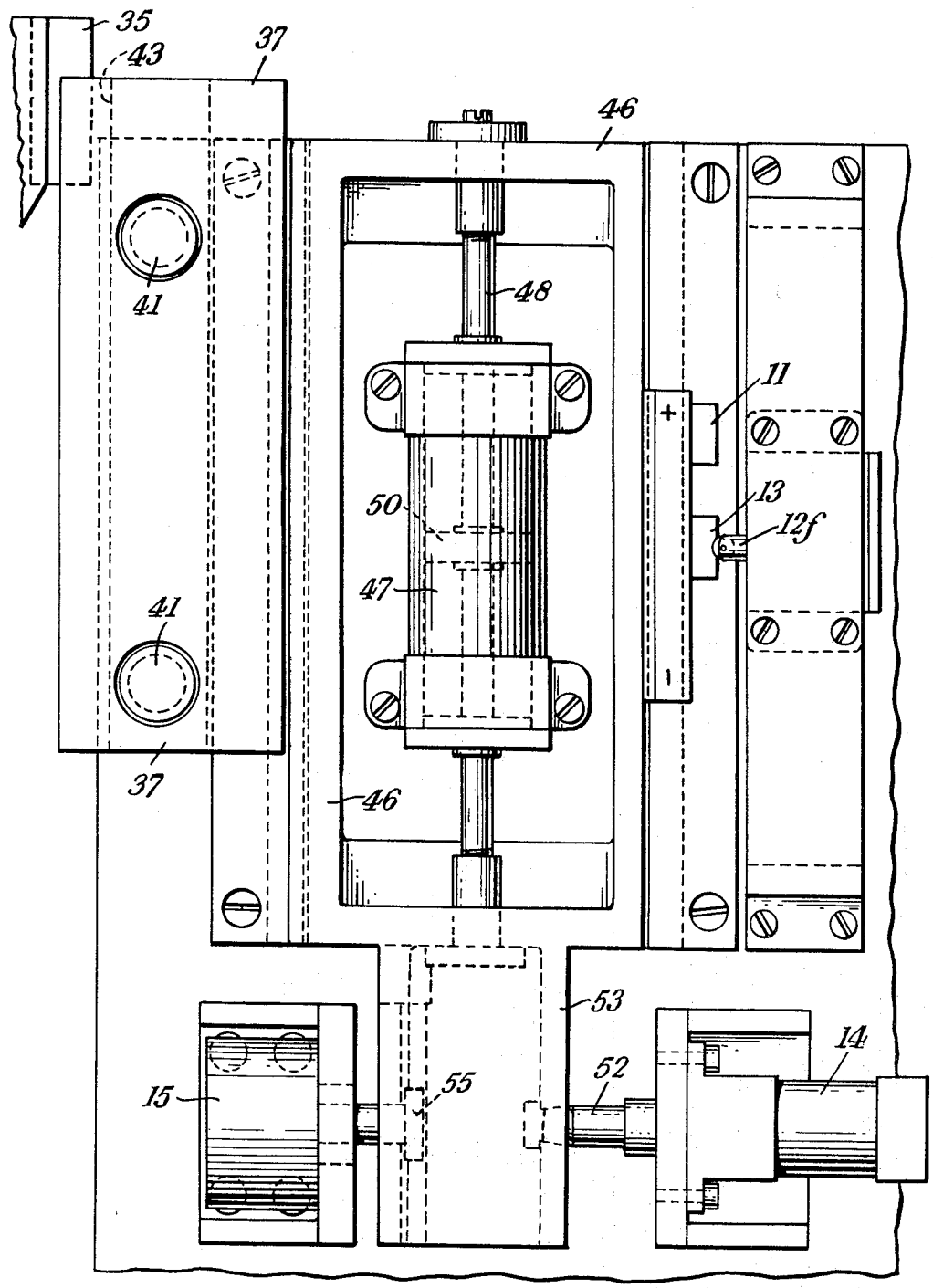
Figure 7:
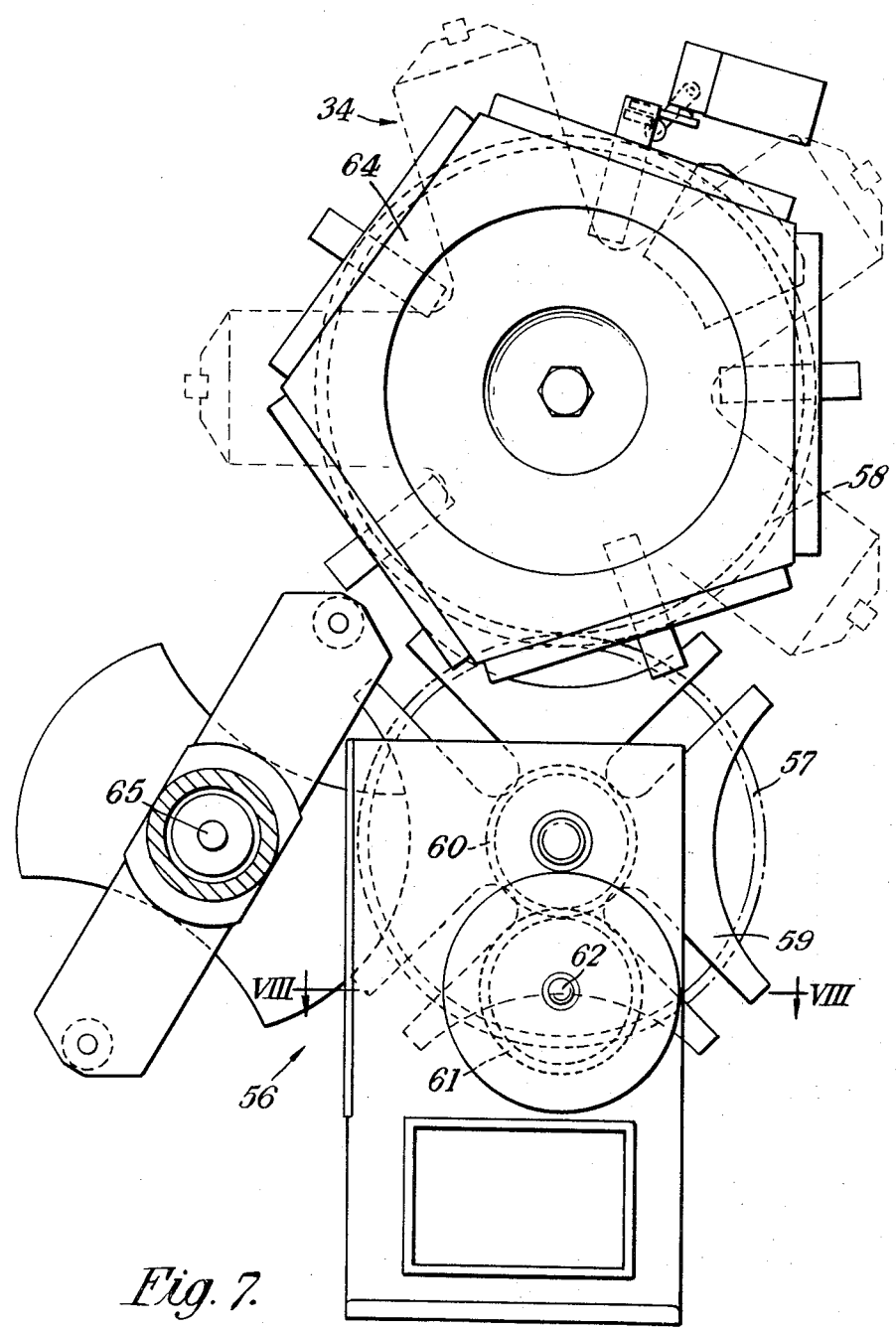
Figure 8:
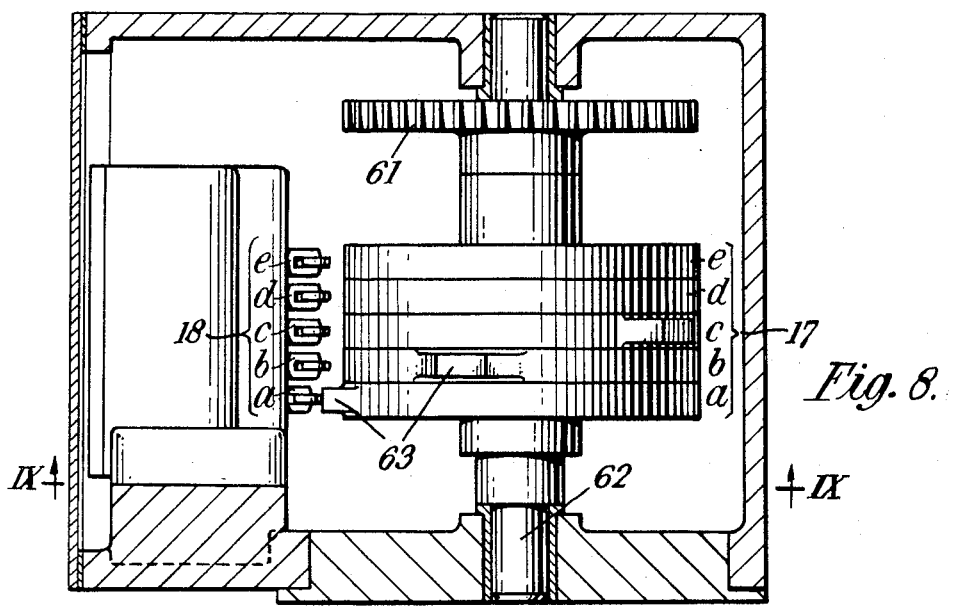
Figure 9:
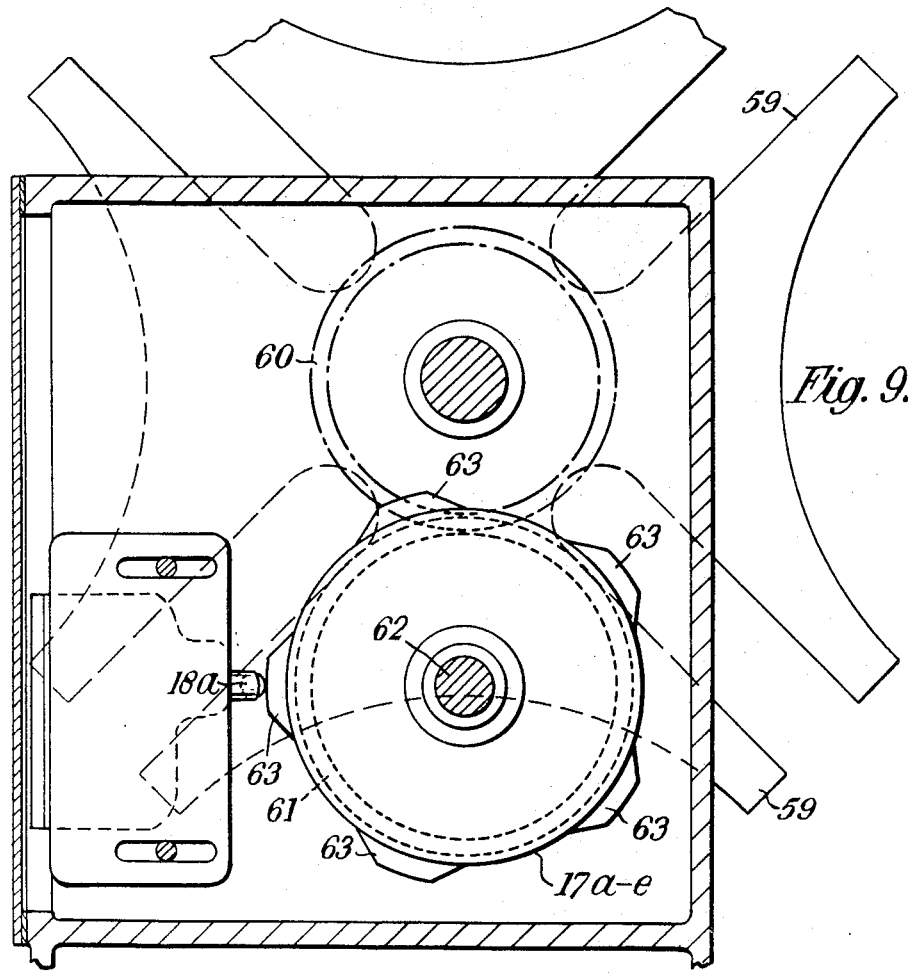

FIG. 3 is an end elevation on a larger scale of mechanism shown at the right hand side of FIG. 2, FIG. 4 is a section on the line IV—IV in FIG. 3, FIG. 5 is a section on the line V—V in FIG. 4, FIG. 6 is a view looking in the direction of the arrow in FIG. 3, FIG. 7 is a view illustrating mechanism for indexing the turret, FIG. 8 is a section on a larger scale on the line VIII—VIII in FIG. 7, FIG. 9 is a section on the line IX—IX in FIG. 8, and FIG. 10 is an electro-hydraulic circuit diagram.

Figure 1:
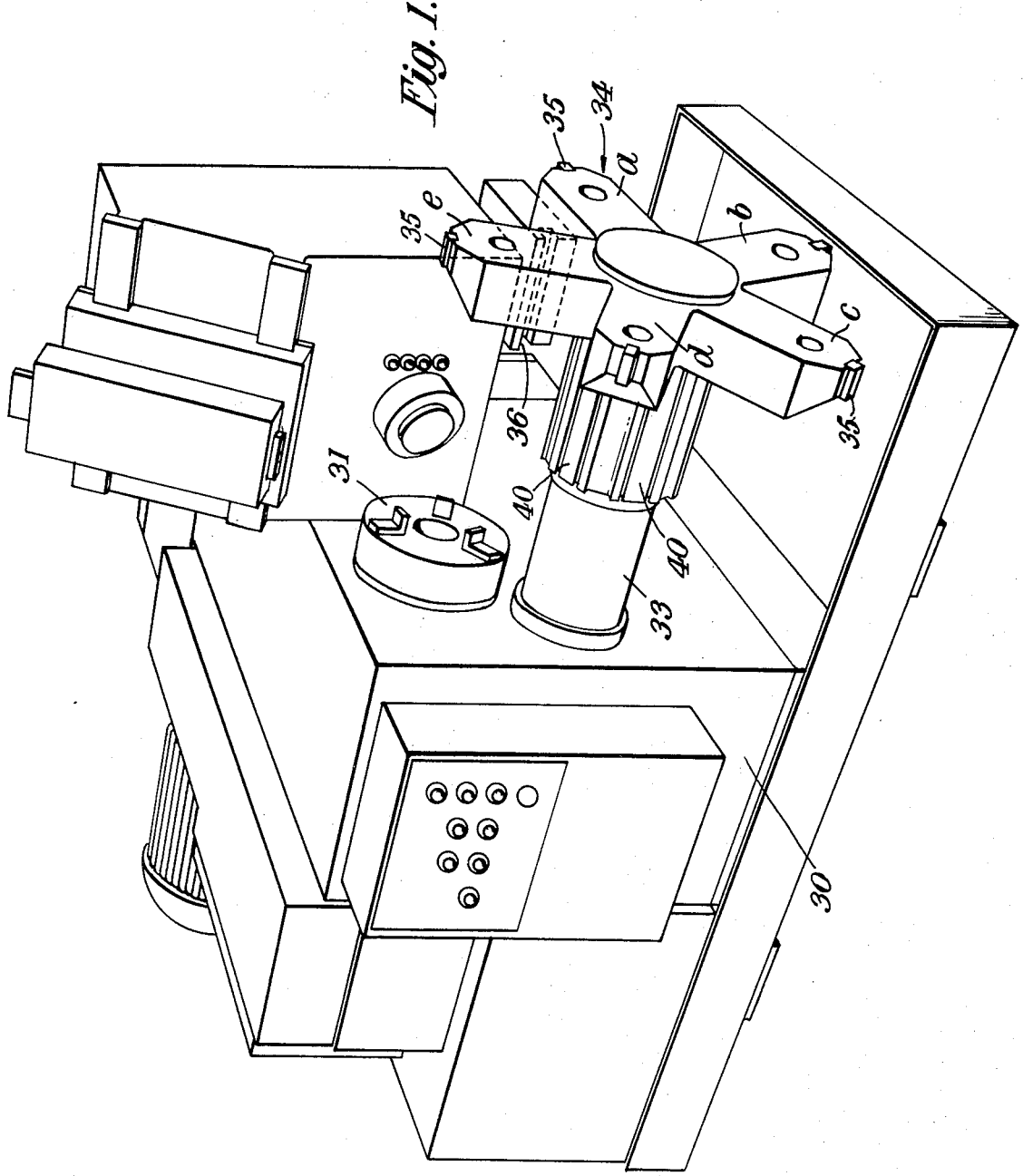
FIG. 1 is a diagrammatic perspective view of the lathe.

The lathe illustrated is, apart from the mechanism providing adjustment for tool wear, of conventional construction. As shown in FIGS. 1 and 2, it includes a casing 30 containing a gear box and conventional mechanism for rotating a chuck 31, carrying in use a horizontally extending workpiece 32, and imparting reciprocating and also rotary indexing movement to a horizontal stem 33 carrying a turret 34 having five arms $a, b, c, d, e$, each carrying a tenon 35 which is engageable with a slot 36 in a guide 37 during infeed of the turret towards the workpiece. The turret is capable of carrying five sets of tools, each associated with one of its arms, which can be brought successively into operation upon the workpiece by indexing of the turret. For simplicity one tool, 38, only is shown in FIG. 2. The tool is mounted on a post 39 mounted on one of five tool supporting faces 40 on the turret. The tool illustratated is operative on the workpiece when the tenon 35 on the arm 34 of the turret is located by the guide 37.

Prior to tool wear adjustment being required the lathe machines workpieces in sequence under the automatic control of a conventional electro-hydraulic control system performing the following cycle of operations.

The turret is advanced towards the work at a rapid infeed rate from the position shown in FIG. 1 to cause the tenon 35 on arm $a$ to enter the slot 36 in the guide. After the turret has advanced a predetermined distance a microswitch is actuated to cause further infeed of the turret to proceed at a slower rate. This infeed continues until a deadstop is reached. The turret then reciprocates back at a rapid rate to its initial position. It is then indexed to bring the next arm $b$ into a position in which its tenon 35 is in register with the slot 36. This procedure continues, the arms of the turret being successively brought to the operative position in which their tenons 35 can cooperate with the guide 37 and the associated tools 38 operating in succession on a workpiece.

After a predetermined number of components has been machined, the measurements of a workpiece are checked to determine whether adjustment of the position of one or more of the tools 38 is necessary to compensate for tool wear and the magnitude of such adjustment. This is effected, as will now be described, by:

a. Causing the turret to interrupt its infeed movement shortly after it has moved from its initial position when an arm corresponding to a tool requiring adjustment is in its operative position has its tenon 35 engaged with the guide 37, but not when the arm in operative position corresponds to a tool which does not require adjustment.

b. Shifting the guide 37 up or down on dowels 41 (FIG. 3) fixed to the machine frame 42 while the turret is so arrested to impart a very small rotational movement to the turret 34 to bring the tip of the tool 38 close to the workpiece. When the tool is situated to the left of the workpiece as shown in FIG. 2, such adjustment must be effected by clockwise rotation of the turret imparted by downward movement of the guide 37 and is hereinafter termed positive. When, however, a tool is situated to the right of the workpiece negative adjustment in the opposite sense will be required and this is accompanied by upward movement of the guide 37 and anticlockwise rotation of the turret.

The guide 37 has a slot 43 (FIG. 4), constituting a slideway, engaged by a projection 45 on a slide 46 which is movable horizontally by a hydraulic cylinder 47 (FIG. 6) fixed to the machine frame, having a piston rod 48 extending from both ends of its cylinder and attached at its ends to the slide 46. The slideway provided by the slot 43 is inclined at a slight angle to the horizontal so that movement of the projection 45 along it will cause the guide 37, which is restrained from horizontal movement by the dowels 41, to move up or down depending upon the direction of horizontal movement of the slide 46.

The extent of movement imparted to the slide 46 by the cylinder 47 is determined by trips 11, only one of which is shown in FIG. 3, but see also FIG. 10, adjustably mounted in slots 49 in the slide 46, so that they may be positioned at different distances from limit switches 12a – 12e associated respectively with the arms a – e of the turret when the piston 50 is in its initial central position in the cylinder 48. These trips 11 coact with the limit switches 12 to terminate the movement of the slide 46 and are preset after the machine has been stopped, at the distances from their respective switches corresponding to the necessary tool wear adjustment and at one side or the other of their respective limit switches depending upon whether positive or negative adjustment is required.

Having set the trips 11 as required, the operator also operates those of five selector switches 16 a – e (FIG. 10), corresponding to the five turret arms a – e, which correspond to tools requiring wear adjustment. These switches 16 are set to + or – according to whether positive or negative adjustment of the related tool is required.

When the machine is restarted and a turret arm corresponding to an operated selector switch is in the operative position a microswitch, operated shortly after entry of the tenon 35 into the slot 36, is rendered effective to cause a solenoid operated valve 20 (FIG. 10) to reverse hydraulic connections to a cylinder 14 (see also FIG. 5) to cause a piston 51 to withdraw a locking plunger 52 from a recess in an extension 53 of the slide 46. After a short time delay a solenoid valve 19 is shifted in the direction determined by the selector switch 16 corresponding to the turret arm in operative position, to connect opposite ends of the cylinder 47 to pressure and exhaust to cause the piston 50 and the slide 46 to move in the required direction.

As soon as the preset trip 11 contacts the corresponding microswitch 12, the valve 19 is returned to its neutral position to arrest the movement of the piston 50 and the slide 46, and a solenoid valve 21 is operated to connect to exhaust a clamp cylinder 15 (see also FIG. 5), allowing a spring 54 to apply a clamp 55 to lock the slide 46 in the position to which it has been adjusted.

The infeed of the turret is then resumed. As the turret retracts, the microswitch again arrests the turret. While the turret is arrested, the valve 21 is reactuated to withdraw the clamp and the valve 19 is then actuated to cause the piston 50 to return towards its central position in the cylinder 47. When the central position is reached a trip 13 on the slide 46 contacts a zero microswitch 12f, the valve 19 is returned to neutral and the valve 20 is activated to reapply the locking plunger 52. The turret then resumes its outfeed movement to the indexing position. The next cycle of operation then commences, the turret dwelling on the infeed stroke if the next tool requires adjustment but not otherwise.

It is necessary to ensure that, when adjustment is made for wear, only that trip associated with the tool undergoing adjustment will be effective. This is achieved by mechanism shown in FIGS. 7–9.

Indexing movement is imparted to the turret 34 and an associated trip drum 64 from a shaft 65 extending from the gearbox of the machine through a Geneva mechanism 56 and gears 57, 58. The Geneva wheel 59 carries a gear 60 meshing with a gear 61 on a shaft 62.

As shown in FIGS. 8 and 9 the shaft 62 carries a set of cams 17 a – e, allocated one to each of the turret arms and having switch actuators 63 spaced angularly at the same spacing as the turret arms. These actuators 63 coact with switches 18 a – e wired to the limit switches 12 a – e respectively. When the turret has indexed to bring its arm a to the operative position switch 18a is closed to render the limit switch 12a but no other of the limit switches 12 a – e operative to terminate the adjusting movement of the slide 46. Prior contact of a trip 11 associated with some other turret arm with its limit switch will therefore have no effect. The switches 18 b – e similarly take control when the turret has been indexed to the positions at which they are closed by the cooperating actuators 63.

As an alternative, the trips 11 may be preset and initiation of tool wear adjustment effected automatically after a predetermined number of machine cycles.

What I claim as my invention and desire to secure by Letters Patent is:

1. An automatic lathe comprising a rotatable chuck to carry workpieces to be machined, a multi-armed tool carrying turret adapted to be indexed about an axis parallel to that of the chuck to bring the tools successively into working position and to perform feed and return strokes in direction parallel to the axis of the chuck, a locating guide for engaging in succession tenons on the turret arms during the feed and return strokes of the turret, and adjusting means for moving the locating guide through a predetermined distance when the tenon on a selected turret arm is engaged in it to rotate the turret about its axis and thereby to vary the radial distance from the axis of the chuck of the tool which is in working position to the extent necessary to compensate for tool wear, said adjusting means including a slide movable in a direction at right angles to the direction of movement of the guide, means confining the guide from movement in directions other than normal to the movement of the slide, the guide having an open channel therein lying parallel to the direction of movement of the guide, and a portion of the slide extending into the channel and having opposed inclined surfaces in engagement with complementary opposed inclined surfaces provided in the channel.

2. A lathe as claimed in claim 1, wherein said adjusting means is effective during a pause in the feed stroke of the turret and operates during a pause in the return stroke to return the tool to its initial radial distance from the axis of the chuck.

3. An automatic lathe comprising a rotatable chuck to carry workpieces to be machined, a multi-armed tool-carrying turret adapted to be indexed about an axis parallel to that of the chuck to bring the tools successively into working position and to perform feed and return strokes in a direction parallel to the axis of the chuck, a locating guide for engaging in succession tenons on the turret arms during the feed and return strokes of the turret, adjusting means for moving the locating guide through a predetermined distance when the tenon on a selected turret arm is engaged in it to rotate the turret arm is engaged in it to rotate the turret about its axis and thereby to vary the radial distance from the axis of the chuck of the tool which is in working position to the extent necessary to compensate for tool wear, said adjusting means including a slide movable in a direction at right angles to the direction of movement of the guide, means confining the guide from movement in directions other than normal to the movement of the slide, an inclined slideway interconnecting the slide and the guide, a hydraulic cylinder and piston assembly for imparting movement to the slide, trips adjustably positioned on the slide and allocated to different turret arms and limit switches aligned with the trips and each associated with an individual turret arm, each limit switch being operative to arrest movement of the slide when contacted by a trip provided the tenon on the associated arm is engaged with the guide.

4. A lathe as claimed in claim 3, comprising a set of further switches wired respectively to the limit switches and cams rotatable with the turret which coact with said further switches to render effective that limit switch only which is associated with the turret arm indexed to the position in which its tenon cooperates with the guide.

5. A lathe as claimed in claim 3, which includes a hydraulically controlled lock for locking the slide in a position corresponding to the central position of the piston in the cylinder, a hydraulically controlled clamp for clamping the slide in the position attained upon operation of a limit switch by a trip, solenoid valves associated respectively with the lock, the clamp and the cylinder and an electric control circuit for effecting sequential operation of the valves to cause release of the lock, relative movement of the cylinder and piston and clamping of the slide in adjusted position.

6. A lathe as claimed in claim 5, which includes selector switches allocated one to each arm and operative to determine the direction of movement of the slide.

7. An automatic lathe comprising a rotatable chuck to carry workpieces to be machined, a multi-armed tool-carrying turret adapted to be indexed about an axis parallel to that of the chuck to bring the tools successively into working position and to perform feed and return strokes in a direction parallel to the axis of the chuck, a locating guide for engaging in succession tenons on the turret arms during the feed and return strokes of the turret, adjusting means for moving the locating guide through a predetermined distance from a normal to an adjusted position when the tenon on a selected turret arm is engaged in said locating guide to rotate the turret about its axis, and a hydraulically actuated clamp interengaging with said adjusting means for postively locking and locating guide in both its normal and in its adjusted positions.

8. A lathe as claimed in claim 7, in which said adjusting means is operative to move the locating guide from its normal to its adjusted position at an early point in the feed stroke of said selected turret arm and to return the locating guide to its normal position prior to the next feed stroke of the turret.

9. An automatic lathe comprising a rotatable chuck to carry workpieces to be machined, a multiarmed tool-carrying turret adapted to be indexed about an axis parallel to that of the chuck to bring the tools successively into working position and to perform feed and return strokes in a direction parallel to the axis of the chuck, a locating guide for engaging in succession tenons on the turret arms during the feed and return strokes of the turret, adjusting means for moving the locating guide through a predetermined distance from a normal to an adjusted position when the tenon on a selected turret arm is engaged in said locating guide to rotate the turret about its axis, and means for positively locking said locating guide in both its normal and in its adjusted positions, selective mechanism for determining whether or not said adjusting means shall be operative and means for releasing said locking means when said adjusting means is selected for operation.

* * * * *